US005754782A

United States Patent [19]

Masada

[11] Patent Number: 5,754,782
[45] Date of Patent: May 19, 1998

[54] SYSTEM AND METHOD FOR BACKING UP AND RESTORING GROUPWARE DOCUMENTS

[75] Inventor: Debra Nakanishi Masada, San Jose, Calif.

[73] Assignee: International Business Machines Corporation, Armonk, N.Y.

[21] Appl. No.: 568,890

[22] Filed: Dec. 4, 1995

[51] Int. Cl.$^6$ ............................ G06F 17/00; G06F 17/30
[52] U.S. Cl. ............... 395/200.43; 395/604; 395/620; 395/621; 395/613; 364/281.3; 364/283.1; 364/963; 364/974.6
[58] Field of Search .................................. 395/613, 612, 395/492, 603, 604, 614, 615, 617, 616, 620, 621; 364/963, 283.3, 222.82, 282.4, 283.1, 283.2, 283.4, 251.6, 225.4, 246, 281.3, 281.6, 974.4, 974.6, 286.2

[56] References Cited

U.S. PATENT DOCUMENTS

| 4,914,586 | 4/1990 | Swinehart et al. ................. 395/612 |
| 4,985,863 | 1/1991 | Fujisawa et al. ................... 395/605 |
| 5,089,958 | 2/1992 | Horton et al. ................... 395/182.03 |
| 5,133,065 | 7/1992 | Cheffetz et al. ..................... 395/181 |

(List continued on next page.)

OTHER PUBLICATIONS

Payack, "PDC software announces new organization to sharpen focus on network storage", PDC Software, pp. 1-2, Jun. 12, 1997.

Worthington, "Improving Electronic Document Management", Office of Government Information Technology, pp. 1-7, Oct. 1995.

Archive Backup Client, Open VMS systems client for IBM's ADSTAR Distributed Storage Manager, Storage Solutions Specialists, Inc., pp. 1, 1997.

PDC, "Network-attached storage, data management, and tape library leaders combine forces to create industry-standard network backup protocol.", Industry-Standard Network Backup Protocol, pp. 1-2, Oct. 28, 1996.

Turrell, "Learning through Experience: How Companies are using Groupware", City University Business School's Notes Report, pp. 1-14, May 13, 1996.

Applied Informatics and Distributed Systems Group, "Computer Supported Cooperative Work", TUM Informatik XI, p. 1, Apr. 22, 1997.

Leeds, "LAN timnes names CA's ARCSERVE top backup and restore solution for WINDOWS NT networks", Cheyenne, A division of CA, pp. 1-2, Sep. 1997.

Leeds, "CA delivers backup agent for NOVELL groupware to ensure recoverability of critical messaging and collaboration data", Cheyenne, A Division of CA, pp. 1-2, Sep. 17, 1997.

IBM Corporation, "OS/2 Warp connect and OS/2 Warp Server –Peer–to–Peer Networking", OS/2 Warp Connect vs. Microsoft NT Workstation, pp. 1-4, 1996.

Primary Examiner—Emanuel T. Voeltz
Assistant Examiner—Cuong H. Nguyen
Attorney, Agent, or Firm—Baker Maxham Jester & Meador

[57] ABSTRACT

A system and method employing logic coupled to a groupware document server and a backup server for enabling back up and restore of a document stored in a document database on the groupware server. The logic is configured with means for restoring an existing document in the groupware document database and also for restoring a document in the database that is marked as being unopenable. The logic is further configured for either restoring a single existing document in the database or a plurality of documents.

40 Claims, 11 Drawing Sheets

U.S. PATENT DOCUMENTS

| | | | |
|---|---|---|---|
| 5,133,066 | 7/1992 | Hansen et al. | 395/619 |
| 5,140,521 | 8/1992 | Kozol et al. | 395/619 |
| 5,155,847 | 10/1992 | Kirouac et al. | 395/200.51 |
| 5,163,148 | 11/1992 | Walls | 395/620 |
| 5,212,789 | 5/1993 | Rago | 395/608 |
| 5,214,781 | 5/1993 | Miki et al. | 395/619 |
| 5,263,154 | 11/1993 | Eastridge et al. | 395/182.04 |
| 5,276,860 | 1/1994 | Fortier et al. | 395/182.04 |
| 5,339,412 | 8/1994 | Fueki | 395/615 |
| 5,381,545 | 1/1995 | Baker et al. | 395/182.17 |
| 5,493,729 | 2/1996 | Solton et al. | 395/483 |
| 5,515,502 | 5/1996 | Wood | 395/182.13 |
| 5,537,590 | 7/1996 | Amado | 395/602 |
| 5,552,901 | 9/1996 | Kikuchi et al. | 358/468 |
| 5,553,216 | 9/1996 | Yoshioka et al. | 395/777 |
| 5,561,793 | 10/1996 | Bennett et al. | 395/617 |
| 5,606,693 | 2/1997 | Nilsen et al. | 395/610 |
| 5,640,554 | 6/1997 | Take | 395/607 |
| 5,642,505 | 6/1997 | Fushimi | 395/620 |
| 5,659,746 | 8/1997 | Bankert et al. | 395/621 |

| Crse. No. | Description | Professor |
|---|---|---|
| Flm – 503 | From Cats to Catwoman – A review of the input of felines on film<br>–Multimedia Report Requirements by graduate assistant, T. Hobbes<br>–Student Roster, T. Hobbes | C. Hobbyss |
| | –(Sample) Report, T. Hobbes<br>–(Mid-Term) Report, B. Spunky<br>–(Final) Report, B. Spunky<br>–(Mid-Term) Report, B. Sassy<br>–(Mid-Term) Report, B. Chritmyth | |
| Flm – 500 | Forum Discussion – Moral Issues of Film<br>–Comments from A. Student<br>–Reply from Dr. Wingwright<br>–Comments from B. Student<br>–Comments from C. Student | D. Wingright |
| Flm – 103 | Big Bucks from Films | S. Spendbigr |
| Flm – 102 | Big Thrills from Films | S. Spendbigr |
| Flm – 101 | Fundamentals of Films | H. Wood |

FIG. 4

SYSTEM AND METHOD FOR BACKING UP AND RESTORING GROUPWARE DOCUMENTS

FIELD OF THE INVENTION

This invention relates generally to data management systems, and in particular, to a method and system for backing up and restoring data in a groupware environment.

DESCRIPTION OF THE RELATED ART

The number of ways for communicating computer data has created a plethora of data that has inundated those who try to manage it for business and academia. The widespread use of e-mail, computer bulletin-boards, and fax machines enable anyone having a fax/modem to send and receive vast amounts of data. Additionally, a growing use of multi-media, such as CD-ROMS with both sound and image data and other means for inputting video information such as cameras with computer communications adapters have increased the different types of data that must be managed.

Groupware is a recently coined term intended to classify software that is designed to coordinate and manage such diverse types of data for multiple users communicating over a network. The term is still in its infancy, so there are a number of current definitions for groupware. However, one highly approved product that has shaped and defined groupware terminology is Lotus Notes developed by Lotus Development Corp., a subsidiary of the IBM Corporation. A widely accepted workable definition of groupware offered in view of the capability of Lotus Notes is given in the book, *"Essential Client/Server Survival Guide"*, by R. Orfali, D. Harkey, and J. Edwards available from Van Nostrand Reinhold, New York, N.Y., 1994. According to that definition, "groupware is software that supports the creation, flow, and tracking of non-structured information in direct support of collaborative group activity." The definition implies that groupware is involved in the management of both information and activities. The information that Groupware manages is termed "documents." A plurality of such documents form a document database.

It is useful to compare a groupware document database to a relational database in order to appreciate how a groupware database is different. A relational database manages all data by requiring that it conform to a rigid structured format. For example, the basic unit of management in an SQL relational database is a table. Thus, all data must fit to prescribed rows and columns of tables. Each table has rows and columns locatable by indices. Data contained in a table may be externally identified at any time by referring to these indices. Such external identification aids tasks such as backup and restoration since it is always clear how to address the data.

In contrast, groupware documents are made up of highly unstructured data—including for example text, image, graphics, faxes, e-mail, and information from an electronic bulletin board. Groupware documents may also include digital sound, icons, formulas, and the information described as a "form" that defines how data may be entered, viewed, and stored. Groupware documents are not required to have external identifiers such as names, or titles, because flexibility of creation and use is encouraged by the lack of formalities. On the other hand the lack of external identifiers and the various ways that data may be entered and stored creates difficulties in backing up and restoring groupware documents and the databases that store them.

A document, in its rawest form, is a collection of diverse types of information. The document is to groupware what a table is to a SQL database, i.e. the basic unit of management. Groupware helps end users create document databases. It can move these documents via electronic mail and database replicas. Groupware includes tools that are needed to query, manage, and navigate through document databases. Documents are the currency of groupware. Typically, groupware launches the tools that create the document. For example if the document contains an image, movie, or sound clip, the groupware will find the data and launch executable code that allows the data to be viewed or heard.

Groupware builds on at least five foundation technologies: multi-media, document management, workflow, e-mail, conferencing and scheduling. Groupware manages these technologies to allow the end user to take advantage of their combined capabilities. It is useful to explore at least one such technology to gain an insight into the complexities of groupware.

Workflow is the technology of processing documents. For example, a work-order for a repair service may require that a document be accessed by telephone company personnel for entering customer information and a description of the problem. The same document should then be accessible to the repair person for entering a diagnosis, to a job estimator for calculating the cost of repairs, to the customer for approving the work, to the repair person for entering their work completion report, and again to the customer again for approving completion and indicating feedback. Further, the document should be accessible to quality control and management personnel who oversee the project. Workflow technology for handling such a sequence is readily available but it is unreasonable to expect all users, including the customer, to adhere to a rigid format. Yet, all the data must be readily available and capable of being located quickly by any user for the system to be useful.

Another technology supported by groupware is image technology. The new technologies of PCs, local area networks, scanners, and optical disks have allowed the automation of image storage as well as the data-centered tracking systems that locate stored images. Image technology supports economical online storage and display of images. In some applications, the cost savings associated with reduced staff and faster online access to groupware documents, i.e. seconds versus hours or even days, justifies the incremental expense for client/server systems. The authors of the "Essential Client/Server Survival Guide", referenced above, estimate it costs $25,000 to fill a four-drawer paper file cabinet and $2,160 annually to maintain it. They further estimate that about 3 percent of paper is eventually lost, with an average cost of $120 to recover a paper document. It is these costs that have encouraged the growth of the electronic image industry and made groupware document management so important.

As with any data processing system it is important to be able to back up groupware documents for maintenance and recovery. It is also valuable that the backup system support more than one backup version as well as deal with different types of backup media. Further, it is valuable to have a groupware system that is capable of backing up and restoring one selected document at a time. The prior art has attempted to provide back up of groupware databases by using file-level back up. Unfortunately such so-called database level backup can not provide the capability to back up and restore individual documents with the databases. Since such documents do not have external identifiers, the prior art does not provide a means to back them up. Thus, there is a clear need in the art to provide a tool that would support the capability to back up and restore an individual document within a database while also providing the capability to back up the entire database.

The need to replicate data in a multi-user database architecture by movement of data among the users poses a unique challenge to a backup function in such an architecture. In this regard, when a document in a Notes database is deleted, it is marked as a "deletion stub", i.e. it is not actually purged from the database but rather marked to be deleted at some later time. The presence of a deletion stub communicates to the replication process that a database has a deletion that must be replicated to other databases that exist on other servers. If a document is accidentally deleted from a database and replication occurs before the document is restored, the restoration of a database-level backup copy is not sufficient without manual intervention. The reason for this is that all the data, including any dates/times, within the restored database reflect values that existed within the database at the time the entire database was backed up. Hence, the erroneous replicated deletion will eventually be replicated back to the restored database, in effect nullifying the restored data. Thus, there is a clear need in the art to provide a way to restore a document that is accidentally deleted from a database to prevent replication type errors. Moreover, it would be an advance to provide the general capability of being able to restore groupware documents that cannot be opened for any reason.

Backing up an entire database may be required in certain circumstances; however, at times it is only necessary to back up that which has changed since the last back up operation. For example, in a database that is not often updated it would be wasteful to back up an entire database when updating a few documents in the database would suffice. Thus, there is a clear need in the art to provide a system having incremental back up capability and also having the ability to provide the above referenced services to solve the above-described problems.

SUMMARY OF THE INVENTION

To overcome the limitations in the prior art described above, and to overcome other limitations that will become apparent upon reading and understanding this application, this invention provides a method and system for backing up and restoring groupware documents.

This invention enables back up and restoration of at least one groupware document stored in a groupware database on a groupware document server. This invention is capable of restoring an existing document in a groupware document database. This invention is also capable of incrementally forming a back up of the groupware database to the backup server in order to back up only those documents in the database that have changed since the most recent backup operation. Further, this invention is capable of restoring a plurality of existing documents belonging to the group document database on the groupware server, and also of restoring a document in the database that is marked as being opened by the groupware document server.

In a preferred embodiment this invention comprises backup and restoration logic in the form of software that is loaded into memory coupled to the groupware document server and the backup server. In another embodiment, the logic is recorded on a recording medium for executing a method according to the invention.

BRIEF DESCRIPTION OF THE DRAWINGS

Referring now to the drawings in which like reference numbers represent corresponding parts throughout:

FIG. 4 is an example of a groupware client's view of groupware documents available in a groupware document database stored in the groupware document server of FIG. 2;

DETAILED DESCRIPTION OF THE PREFERRED EMBODIMENT

This invention is described in a preferred embodiment in the following drawing figures. In these figures, a like number shown in various figures represent the same or similar elements. While this invention is described in terms of the best mode for achieving specific objectives, it will be appreciated by those skilled in the art that variations may be accomplished in view of these teachings without deviating from the spirit or scope of the invention. In particular, certain aspects of this invention are described as operating in terms of computer software in computer memory, but this invention may also be embodied in whole or in part in application specific integrated circuitry (ASIC) by one skilled in the computer arts in view of the teachings herein.

The terms "groupware server" and "groupware server logic" are used throughout this description to denote server logic that may reside within a groupware application or product. Many groupware systems have client and server components and access to database contents is provided through the client code, with the active cooperation of logic in the server component.

In this description, a "server" denotes a node at which a system resource is managed. The server provides to system users the service of access to the resource. A "client" is a local process at a user that acts as an agent of a server when the user requires access to a resource managed by the server.

System Architecture

Figure 1:
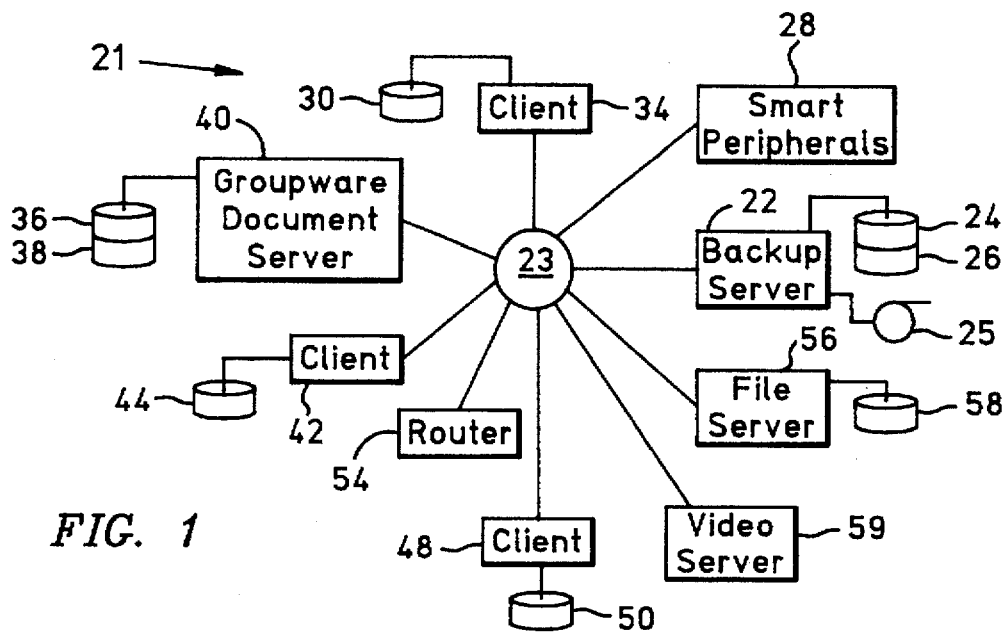
FIG. 1 is a block diagram of a groupware environment employing this invention.

FIG. 1 shows a preferred groupware environment 21 for the operation of this invention. A backup server 22 is connected by a communications network 23 to client workstations (clients) 34, 42, and 48, a groupware document server 40, smart peripherals 28, a file server 56, a video server 59 and a router 54 for communicating with other networks. The smart peripherals may send electronic mail (e-mail) messages to the clients and the server to indicate that events have occurred, such as print jobs that are completed or errors that have occurred. Such data may eventually become data stored in a database on a server or client. The backup server has a storage unit 24 and mountable media 25 for storing backup copies 26 of documents of a groupware document database 38 that is itself stored on the groupware document server storage unit 36. The different kinds of storage media can comprise a hierarchy of backup storage. The backup storage unit may be, for example, a hard disk drive with magnetic or optical storage capability. Clients 34, 42, and 48 each have a respective storage unit 30, 44, and 50 on which private databases may be kept and accordingly the logic of this invention enables backup copies of these documents to be stored on storage unit 24 of backup server 22.

A file server 56 is also shown as part of the groupware environment for the sake of completeness and to contrast the well-known role of a file server with the relatively new concept of a groupware document server. A groupware environment does not require a file server, but a typical business or academic groupware environment would likely include one. The file server's role is to make applications stored on storage unit 58, such as spreadsheets and wordprocessors, available to clients on the network and to store user files created in association with such applications. A user may in fact use the file server as a client to the groupware document server for the purposes of creating, and viewing documents in the groupware database.

Recall that the documents in the groupware database are referred to as "unstructured" for having no rigid format that their data must adhere to. A groupware document may be thought of as a container of manifold types of information. Groupware data used to construct documents may include text, image, graphics, faxes, e-mail, and general multi-media including music. Thus, the clients in the groupware environment depicted in FIG. 1 inherently include an assortment of well-known computer multi-media equipment such as video equipment, digital sound creation equipment, CD-ROM, scanners, fax machines, modems, and other communication equipment including those devices that are not presently in existence but will serve similar purposes to those described above.

For the purposes of this specification, documents are broadly defined to encompass any record-level piece of data within a groupware database, including forms, icons, formulas, and data from e-mail including that from users and machines, such as the smart peripherals discussed above. Documents may contain many data types, including text, graphics, image, video, and audio. Documents can be made up of data which is actually stored partially in the document itself and partially in other documents in the same database or in different databases.

The inventor has recognized that it is expensive to copy each entire groupware database onto the backup server's storage unit. Accordingly, she has provided the logic of this invention, which enables the file server to interact with the backup server to provide services that make such duplication unnecessary. However, she has also recognized that such duplication may, in certain circumstances, be appropriate. Thus, the logic of the invention enables the backup server to provide the above-referenced services while also having the ability to restore an entire groupware database. The logic is shown as being implemented in the memory of the groupware server but could be implemented at any appropriate point in the system of FIG. 1, including the backup server. Although, it is preferred to provide the logic in the form of modules on a server workstation, one skilled in the art will recognize that any workstation having the ability to communicate on the network can be configured with the logic of the invention to operate in conjunction with the backup server. Thus, for example, client station 42 could serve the same function as server 40 for carrying out the operation of the invention even though it might be somewhat more encumbered than the server in terms of performance because it would have to access the groupware document database over the network.

Figure 2:
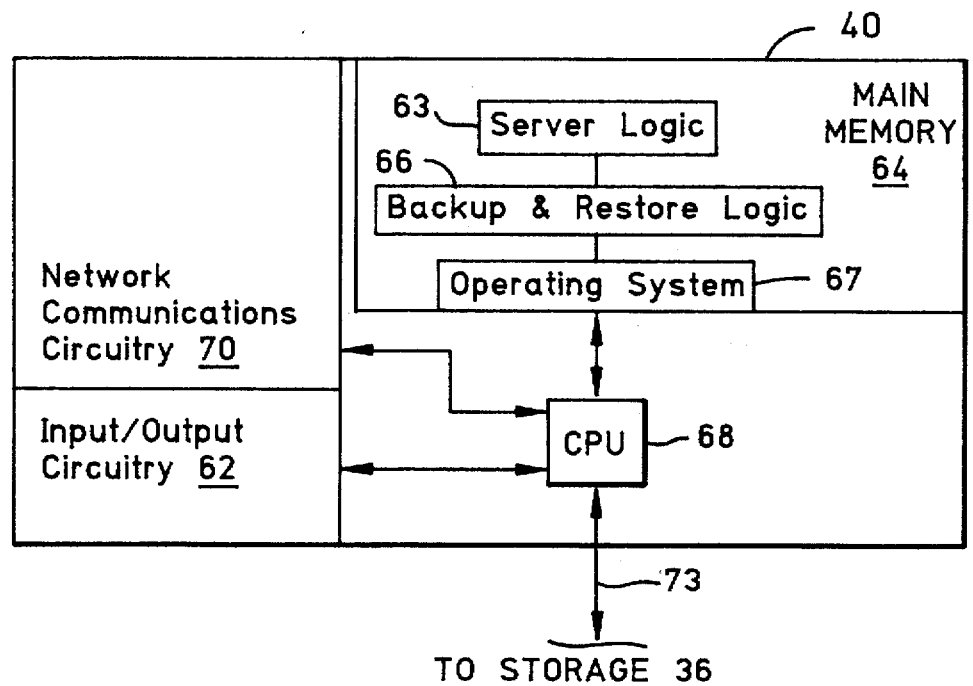
FIG. 2 is a block diagram of back up and restore logic of this invention shown in an architectural relationship with a groupware document server operating in the groupware environment shown in FIG. 1.

Referring to FIG. 2, the groupware document server 40 includes a central processor 68 that operates as the central control unit of the server hardware as well as the main engine for running software, including backup and restore logic 66 which embodies the present invention. The processor is in communication with input/output circuitry 62 to enable communications with various input/output devices such as displays, keyboards, and pointing devices. Additionally, the processor is in communications with network communications circuitry 70 for enabling communications on network 23 (FIG. 1), which may be a local area network (LAN) of a well-known topology such as a token-passing ring or ethernet bus. Main memory 64, which may be well-known random access memory or read only memory, loads software that supports this invention. The software is typically loaded into main memory from mass storage 36 when the server is powered up. The mass storage 36 may be a well-known direct access storage device, such as a hard disk drive. Communications between main memory 64 and mass storage unit 36 is achieved through data bus 73.

Logic of this invention

Figure 3:
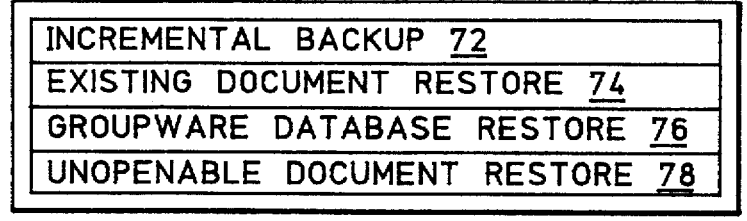
FIG. 3 is a block diagram of modules of the logic of this invention depicted in FIG. 2.

Referring to FIGS. 2 and 3, the backup and restore logic 66 is embodied as a computer program having four modules and is loaded into main memory 64. In this description, the four modules are treated separately in order to distinctly describe their respective functions and characteristics. However, although the invention supports four distinct paths of logic that provide distinct functions, the preferred embodiment of the invention is in computer-executable code that is not differentiated into four separate, executable files. The logic embodying the invention operates under control of an operating system 67, which may be for example IBM's OS/2, Microsoft's Windows, or the well-known UNIX system. Groupware document server logic 63 provides commands and instruction sets that control access to documents in the database 38 (FIG. 1). The logic 66 communicates directly with the logic 63. The logic 66 includes an "incremental backup" module 72, an "existing document restore" module 74, a "groupware database restore module" 76, and an "unopenable database restore module" 78.

The module 72 gives the backup server the capability to scan through a particular database in the groupware environment and backs up only those documents which are new or have been modified since the last incremental back up. Additionally, adjustments are made to reflect deletions of documents from the database since the last back up operation. In the instance when a database has been created after the last back up operation all of the documents in the database are backed up.

The module 74 supports back up and restoration of a particular document selected by a user. The invention uses the groupware document viewing facility as a way of retrieving a document into memory so that its internal identification can be discovered. This capability is needed in a groupware environment because groupware documents often have no required external identifier, such as a name or title that each document must have and therefore prior to this invention the user had no convenient method to back up a particular document because he/she was unable to identify it.

The module 76 enables the backup server to restore an entire database back to the level of the database at a particular point in time. The module is capable of restoring the entire database according to either of two embodiments. In a first embodiment, the server is enabled to restore an entire database by merging restored documents with a previously restored database. This first embodiment works in conjunction with module 74 to restore the database following the document level restore. In a second embodiment, the entire database is restored by the module rebuilding a copy of the database from the most current backup copies of documents that reside on the backup server.

The module 78 provides the capability for restoring a document that cannot be opened. For example, some documents are marked to indicate that they are to be deleted. Generally, once these documents are marked, they are inaccessible to other software applications. However, there may be a reason to open such a file for backup, i.e., the file was erroneously marked for deletion. Prior to this invention there was no convenient way for a user to create a backup copy of a file erroneously marked for deletion. This invention allows the user to restore a document that cannot be opened or updated directly.

Although the logic of this invention is adaptable to any groupware document server software and any backup server software, the inventor has recognized that the logic of this invention is particularly best for a groupware document server that operates under control of the groupware document server software known as Lotus Notes (Notes) available from Lotus Development Corporation and a backup server operating under the control of Adstar Distributed Storage Manager (ADSM) software available from IBM Corporation.

The logic of the invention is best implemented for communicating with the backup server software and the groupware document server software through an Application Programming Interface (API). An API is a set of software functions that a user can use to access services and communicate with other software. For example an operating system typically offers an API that includes basic reading and writing of files. Lotus Notes, the preferred groupware document server software, offers over 100 functions through API's that are publicly available to other programs and are also used by Notes itself. Basic functions are offered through API's that are part of the ADSM backup server logic also. The functions include being able to send and receive data to and from the ADSM backup server. The logic of this invention essentially queries the API's and then figuratively glues the data from the two sets of API's together.

The logic of this invention calls the groupware document server logic in order to scan through the documents database. In the preferred embodiment the groupware document server logic is Lotus Notes. In this case the invention's logic calls a Notes API function called NSFSearch to scan through the database. For each document it finds, it calls a callback routine that receives information from the NFSSearch API. Some of the information obtained by the callback routine is stored in a data structure that will be discussed below with reference to FIG. 9A. This data structure represents a datastream that is sent to the backup server.

Another Notes API function, NSFNoteGetInfo, is called to allow the logic of this invention to get remaining data about a particular document that is unavailable from NFS-Search. NSFNoteGetInfo must be called for each piece of data desired for a document because the API does not pass a complete data structure filled with data and therefore data is obtained on this piece-meal basis.

The data within a Notes document is referred to as an "item." Thus, in a preferred environment, documents are divisible into items. For example, a document that represents a chapter of a book might be comprised of the following items: (1) a chapter title; (2) a body of text; (3) a graphic illustration; (4) a statistics table; and (5) a subheading.

The logic of this invention recognizes and stores enough information to rebuild each item that makes up a document in order to restore and back up documents. Therefore, the logic is enabled to build a data structure for the document itself and including data fields dedicated to each item making up the document. Information about these items is obtained from the API NSFItemInfo. Additionally, information regarding the storage location or database path of each document is combined with information obtained from that API to create a data object for maintaining data integrity of specified documents by enabling the back up and restore operation.

Notes also has a special type of item, referred to as an "object." A groupware object includes composite data that either defines a specialty function, like an attached file, or is displayed to the user in a format determined by another application. An example is an attached file, which appears in a document as an icon. When the icon is invoked through a well-known double clicking of a mouse button options are given to a user (usually through a dialog box) to disconnect the file. Such a function might be handy for attaching a big file to a message so that the receiver can read the message, detach the file, keep it the file, and discard the message. Another example is a Window's OLE (object linking and embedding) object.

The Lotus Notes groupware document server logic identifies documents, referred to as "notes", by various internal IDs. A single note will have a universal note ID (UNID), an originator note ID, and a replication note ID, among others. Lotus Notes keeps these for its own purposes but they must be retained and kept intact, generally, by the logic of this invention so that the document can be restored accurately. Additionally, the inventor of this invention has critically recognized that these internal IDs, and in particular the UNID, may be used to identify documents for the purposes of back up and restore so that the problem of not having external identifiers for documents is largely circumvented.

Additionally, the logic of this invention is enabled to send a data stream containing a data field representing the entire document database. Table 1 is a psuedocode representation of the preferred embodiment of a portion of the logic of this invention that creates the data structures that are sent to the backup server and used for the restore and back up of document data. These data structures are used to build document data objects that are manipulated by the invention to back up the groupware document database and restore documents of the groupware document database. The table is explained in terms of the data structure with reference to FIGS. 9A and 9B below. For example, the structure InNoteDbHdr (shown in the data stream of FIG. 9B and created by the logic of this invention, as illustrated in Table 1 below) is a byte stream of data that can be parsed with the logic of this invention but is otherwise unintelligible.

The table is further understandable for the purposes of practicing this invention with reference to the operation of the invention described with reference to the flow diagrams, FIGS. 10-19. The psuedocode is written for execution by a "C" language compiler and it is envisioned that one skilled in the art will have familiarity with the well-known "C language and also how to program API's including those presented with Lotus Notes and ADSM" for operation of the preferred embodiment of the invention.

TABLE 1

```
#ifndef _H_LNPARMS_
#define _H_LNPARMS_
#define ITEM_BUFFER_SIZE 32768
#define BIG_BUFFER_SIZE 65536
#define NOTES_OBJECT_MEM_SIZE 65000
typedef struct S_InNoteHdr /* Document Header */
{
  int16 structSz;        /* Size of structure, including dbInfoBuff*/
  int16 structVers;      /* Structure version*/
  DBID ;                 /* Notes database id*/
  NOTEID ;               /* Note id within a db*/
  OID ;                  /* Notes OID originator id*/
  WORD nClass;           /* Notes "note" class series of flags - help*/
  WORD preV3Priv;        /* Notes privileges - pre Notes vers 3.0*/
  WORD NFlags; /* Flags for note generic flags - security*/
  TIMEDATE lastacc;      /* Date/time of last access of note
                            changes were accessed*/
} InNoteHdr;
typedef struct S_InNoteDbHdr (database header)
{
  int16 structSz;        /* Size of structure, including dbInfoBuff    */
  int16 structVers;      /* Structure version                          */
  int16 dbHdrInfoLen;    /* db header info length                      */
  TIMEDATE dbHdrBackupTD; /* date/time of backup -                     */
  used for later search
  char dbHdrInfo[NSF_INFO_SIZE+1]; /* database header info    */
  DBREPLICAINFO ; /* Replication info                          */
} InNotedbhdr;
typedef struct S_InNoteItemHdr
{
  int16 structSz;        /* Size of structure*/
  int16 structVers;      /* Structure version*/
  char magic;            /* magic number*/
  WORD ItemFlags;        /* Item flags*/
  DWORD ValueLength;     /* Length of Item char string that follows*/
  WORD NameLength;       /* Length of Item name*/
  uint8 reserved;        /* unused right now */
  uint8 dataFlags;       /* Values listed below*/
  DWORD nObjSize;        /* size of object that goes with item object*/
  WORD nObjclass;        /* Notes object class*/
  WORD nObjPriv;         /* Notes object privileges*/
  char data[1]           /* Item name and value*/
} InNoteItemHdr;
/* #define ITEM_HDR_SIZE 23 in bytes don't include the data[1] */
#define ITEM_HDR_SIZE sizeof(InNoteItemHdr) -
1 /* don't include data */
/* values for dataFlags in InNotesItemHdr.
This field is used to tell the programmer
about any special information
he should know about the data stream that follows this header.*/
#define DF_NOTES_OBJECT (uint8)(0x0001)
/* This data stream has a notes object         */
#endif /* _H_LNPARMS_ */
```

Table 1 is best understood with reference to the description of the data structures created by the logic of this invention and with reference to the description of flow charts, both descriptions in this specification appearing below.

Data Structures

Figures 9A, 9B, 9C, 10:
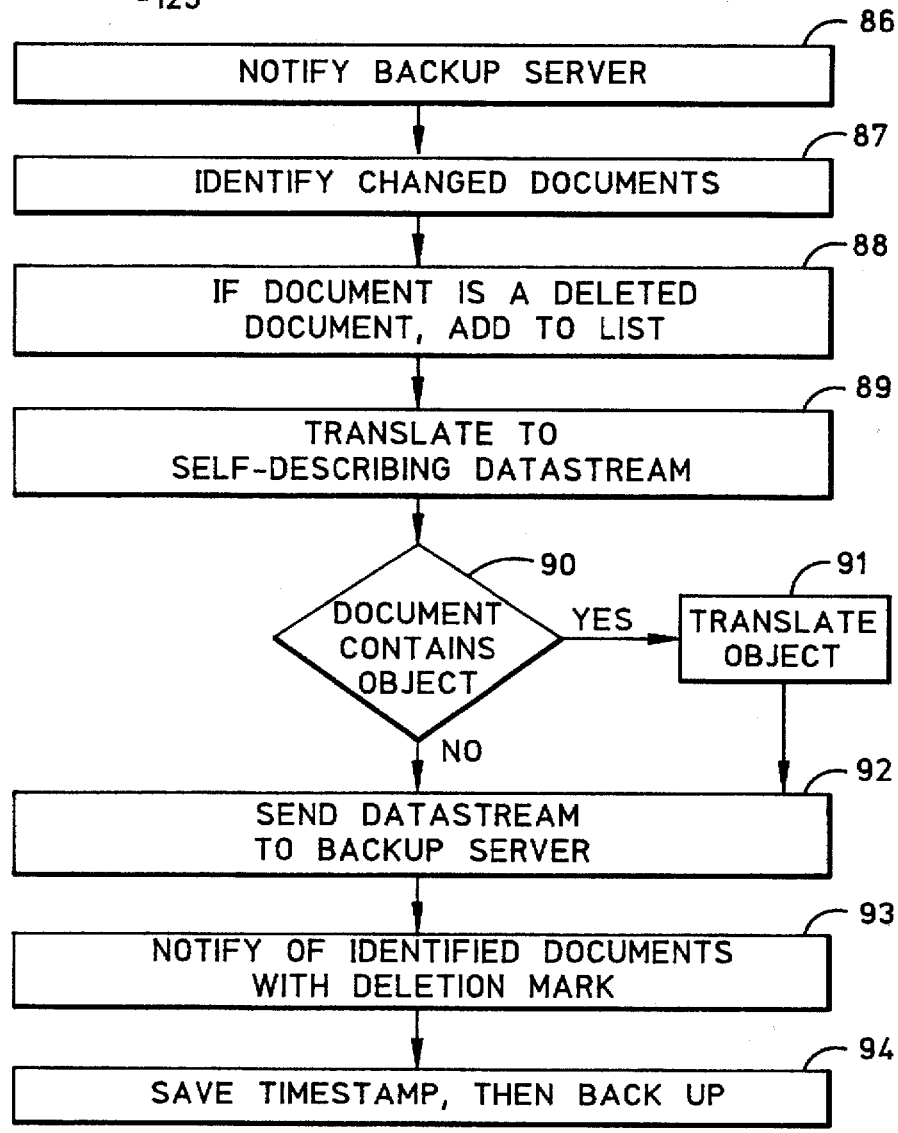
FIG. 9A is a data structure created by the logic of this invention to enable the operation of this invention.
FIG. 9B is another data structure used by logic of this invention to manage the operation of this invention.
FIG. 9C is still another data structure used by the logic of this invention to manage the operation of this invention.
FIGS. 10, 11, 12, 13, 14, 15, 16, 17, 18, and 19 are each flow charts showing the operational sequence of the method of this invention carried out in the groupware environment of FIG. 1.

FIG. 9A is an example of a document data object made of a series of data structures used by logic shown in FIG. 2 to manage the operation of this invention depicted in the following flow chart diagrams described below. The structure "InNoteHdr" 101 contains descriptive data pertinent to the document itself. The contents of the descriptive data appear in Table 1, in the section enclosed in brackets following "typedef struct S_InNoteHdr" and before "InNoteHdr;". The comments for each executable line of pseudocode describe that which the field contains. The comments are included between delimiters that appear as "/*" and "*/". For example, the executable line "int16 structSz" contains data identifying the "Size of structure, including dbInfoBuff", wherein dbInfoBuff refers to the size of the database, and is defined in documentation available with the groupware document server.

A piece of data within the structure "InNoteHdr" 101 is the part built by the executable code statement "TIMEDATE lastacc" (Table 1) which includes the "Date/time of last access of the note." By keeping up with the date and time of the last access the back up of the data may take place without interfering with a replication service that may be used on the groupware service. Replication may be used, for example, to allow one groupware server to send data to another groupware server. A disadvantage of database-level backup services of the prior art is that they do not reflect the most recent time that a document has been restored and replication is triggered by such date/time information. Thus, replication of restored data may not occur because of this out-of-sync condition.

The "InNoteItemHdr" structure 103 contains data that contains descriptive data about an item that may make up the document. Datafield 105 contains the "ItemName" which is descriptive data that contains an identifying name of the item. Datafield 107 contains the "ItemValue" which is the actual data itself that makes up the item named in the "ItemName" field. Datafield 109 is also a InNoteItemHdr structure to indicate that there are typically several items in a document and each item must be identified by such a datafield. Similarly, datafields 111 and 113 respectively contain the corresponding datafield of ItemName and ItemValue.

The "InNoteItemHdr" structure 103 is constructed by a portion of the code shown in Table 1. Referring to Table 1 above, with reference to the section of the psuedocode enclosed in brackets following "typedef struct S_InNoteItemHdr" and before "InNoteItemHdr;" the comments for each executable line describe that which the field contains. As described above, the comments are included between the delimiters "/*" and "*/". For example, the executable line "int16 structVers" contains data identifying the "Structure Version".

An almost identical data stream of the type shown in FIG. 9A is shown in FIG. 9B, wherein fields 115, 117, 119, and 121 are identical in type to those described with reference to fields 101, 103, 105, and 107 respectively. The data stream in FIG. 9B is different from the structure of FIG. 9A because of the addition of a "Notes Object" field which contains dynamic linking information which is useful for file attachment, as described above.

FIG. 9C shows a data stream containing only field 125 containing "InNotedbhdr" which is descriptive data about the database of documents itself. The InNotedbhdr structure is constructed by a portion of the code shown in Table 1. Referring to Table 1 above, with reference to the section of the psuedocode enclosed in brackets following "typedef struct S_InNoteDbHdr" and before "InNotedbhdr;" the comments for each executable line describe that which the field contains. For example, the executable line "int16 dbHdrInfoLen" contains data identifying the database header information field length.

A part of field "InNotedbhdr" is built by the code "TIME-DATE dbHdrBackupTD". This part includes the "date/time of back up" and is used for a later search through the database. Use of this value allows the process to distinguish which documents in the database have been changed or are new since the last incremental back up.

Groupware Document Database Example

FIGS. 4–8A and 8B provide an example of a groupware document database that includes a plurality of documents. The examples are shown for the purpose of teaching how the system of this invention including the logic modules referenced above function to maintain data integrity of individual documents stored in a document database. Thus, the examples are not limitations of this invention. It will be apparent to those skilled in the art that the invention is capable of backing up any type of document stored in a groupware database.

FIG. 4 shows a hypothetical user's view of documents in the groupware database. The user may be logged-on at any client in the network 23. Assume, the user is part of a hypothetical university that teaches students careers related to film. Viewport or window 60 appears on a display (not shown) on the client and contains a title bar 79 entitled "GROUPWARE DOCUMENTS." The title bar also contains information that changes to indicate how the information is presented on the client's viewport. In this example, the information is arranged as "Courses: By Course." In other words the database primarily contains documents dealing with college courses and this particular presentation-view shows the documents arranged sequentially by course number. The documents are arranged in a hierarchial presentation with certain documents being presented in a subservient fashion to "main documents." In this example, each course description is the main document and certain documents pertaining to the same course are considered subservient to it. A short narrative title describing a course represents the course description document. Double clicking on the title brings up a presentation of more information describing the course. For example, a document containing data that contains student information, referred to as "Student Roster, (by) T. Hobbes" is presented one-hierarchy level below the course description entitled "From Cats to Catwoman: A review of the impact of felines on film."

In this example the client has used the "Action bar" tool 80 to select a presentation or view by selecting the "View" Action. The particulars of "how" the data is arranged by the groupware server logic is not important to the teaching of this invention. However, since the documents may be arranged in a variety of ways within the database and contain no required external identifier, the complexity of backing up and/or restoring documents should be apparent to those skilled in the art. For the sake of understanding the invention, the examples shown are based on the preferred groupware document server software Lotus Notes.

The selection of a particular view option has allowed the client to arrange the documents by descending course number, or in this example. "Flm-503", "Flm-500", "Flm-103", "Flm-102, and "Flm-101". The title of the course Flm-503 has been discussed and the titles of the others are in respective order, "Forum Discussion—Moral Issues of Film", "Big Bucks from Films", "Big Thrills from Films", and "Fundamental of Films." Each has a professor who is listed in the view, and in respective order (including Flm-503) are, "C. Hobbyss", "D. Wingright", "S. Spendbigr (Flm 103&102)", and "H. Wood."

The documents available in the database for Flm-503 further include "Multimedia report requirements" by graduate assistant "T. Hobbes" which describes, in this hypothetical example, how the students are to prepare their reports in multimedia format. An icon 81 that appears to be a cat's face in viewport 60 is used to open a document containing a sample report made by the assistant, T. Hobbes. This example of a multimedia document that is launched by an icon is described below in more detail with reference to FIG. 7. Each student's report is included in the database, from which it can be ascertained that student, "B. Spunky" has submitted his "Mid-term" report and "Final" report while the other students, "B. Sassy" and "B. Chrithmyth" have not yet submitted their final versions.

Referring again to FIG. 4, in this example the course "Flm-500" is intended to be a course conducted electronically. Students create documents that are the equivalent of e-mail and the professor, "D. Wingright" has the option of creating another document equivalent to e-mail by replying to their documents. In this example we see that "A. Student" has composed a document and "D. Wingright" has replied. No reply has been made for comments from "B. Student" and "C. Student."

Figure 5:
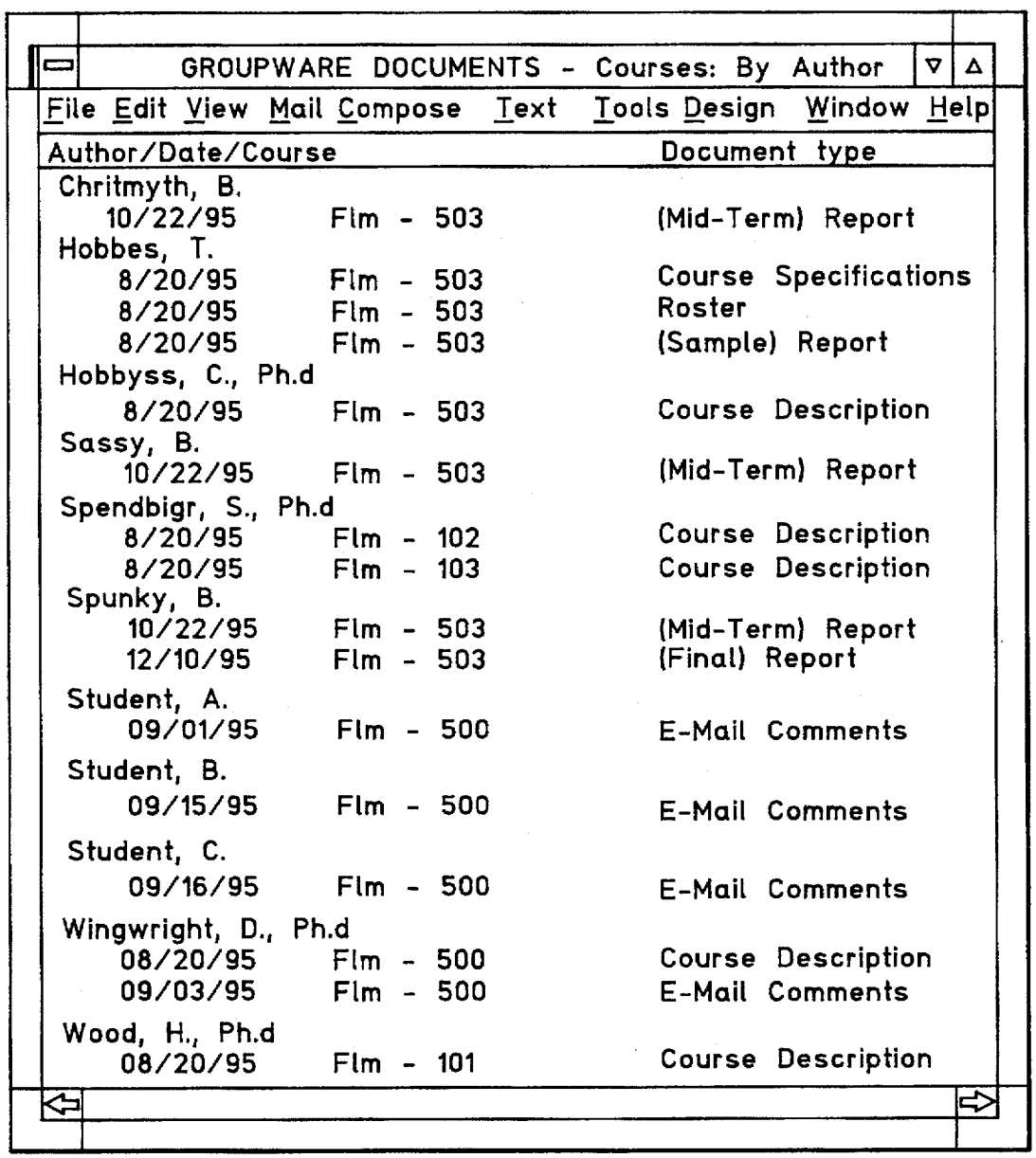
FIG. 5 is an example of an alternative view of the same groupware documents viewed in FIG. 4.

Assume in this hypothetical example that another client wishes to view information in the same database in a different way than that shown in FIG. 4. Accordingly, an alternative view is shown in FIG. 5. Assume that the client has chosen to view documents by author instead of by course. In this case the documents are presented by author arranged in alphabetical order according to the last name beginning with "Chrimyth" and ending with "Wood." For each document the date of creation is shown, with the course, and document type. It can be appreciated that documents could be sorted and stored in various ways including by document type. The "Document Type" column shown on viewport 60 indicates a particular data "form". A form defines how the data can be viewed. The data which describes how to create the form is stored in one place in the database, and the data that is contained within a particular document adhering to that form will be stored somewhere else. This further complicates the problem of backing up and restoring documents in a groupware environment; however, the inventor has critically recognized techniques for doing so that are described below in the section titled "Operation of the Invention."

Returning to the example of FIG. 5, three documents are shown for author "T. Hobbes" and this comports with the same information shown in a different way on FIG. 4. Further, we can see that all three documents were created on Aug. 20, 1995. Similar information exists for each author. FIGS. 6, 7, 8A, and 8B are each examples of the different documents shown in FIGS. 4 and 5 for various authors.

Figure 6:
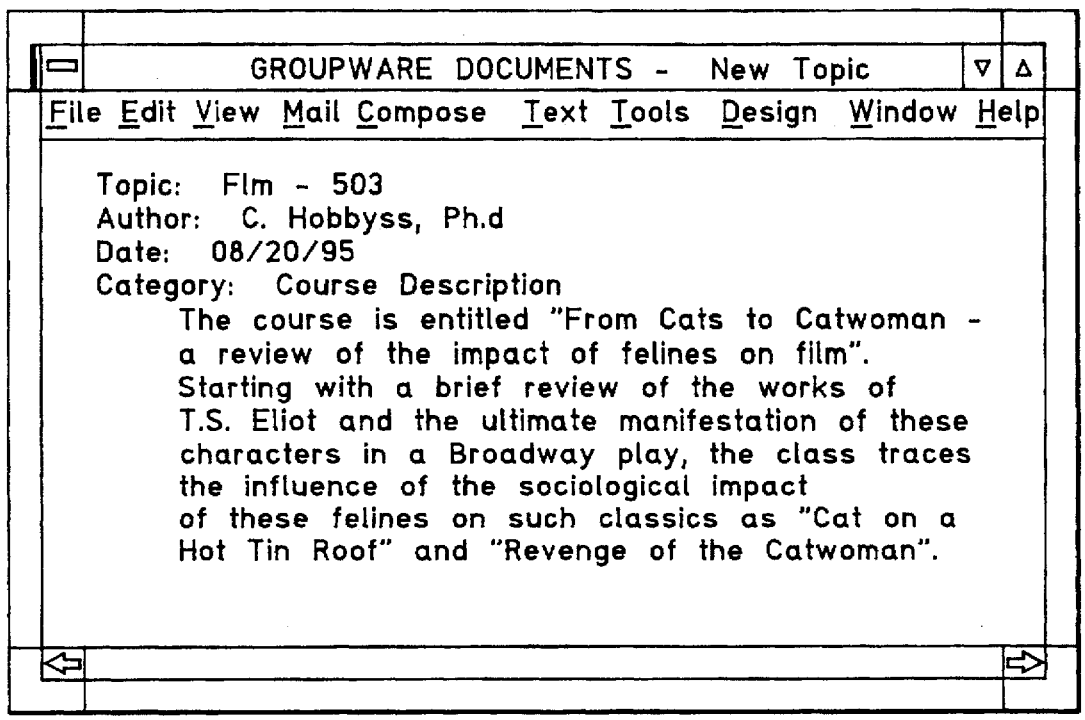
FIG. 6 is an example of a client creation of a document that is to be stored in the groupware document database.

FIG. 6 shows the creation of a "New Topic" as shown in title bar 79. The category of this new topic defines the document type (FIG. 5). In this example the category is "Course Description" wherein the hypothetical professor, C. Hobbyss, Ph. D. has entered the text description of the course so that students can be decide if they wish to take the course. The document is stored in the database upon completion and accessible to any client for viewing. Rights to modify the description are of course dependent on that assigned by a groupware administrator and are not particularly pertinent to this invention.

Figure 7:
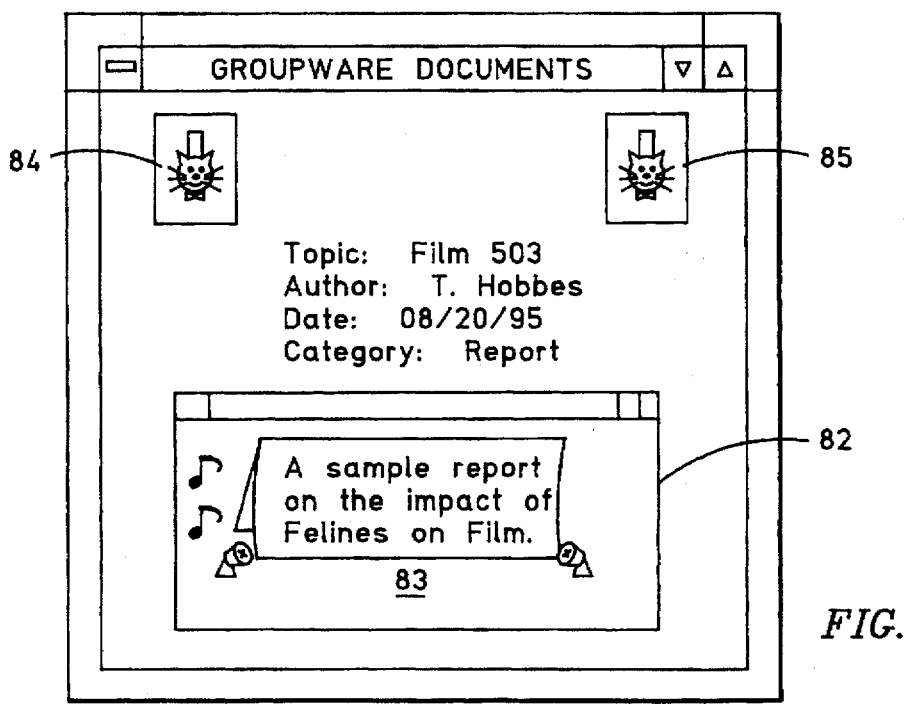
FIG. 7 is an example of a multimedia document existing in the groupware document database.

FIG. 7 shows the hypothetical example of a multi-media document opened by the icon 81 in FIG. 4. In this example the document includes animation and includes sound clips. The animation is contained in another icon within the document. The icon launches a video 82 of animated spotlights moving animated light beam graphics that sweep across a title banner graphic 83 while music plays over speakers accompanied by musical note graphics. The document also contains still graphics 84, 85 of cats dressed up in top hats and bowties. The category is shown as "Report" which indicates a document form having multi-media capability.

Figure 8A:
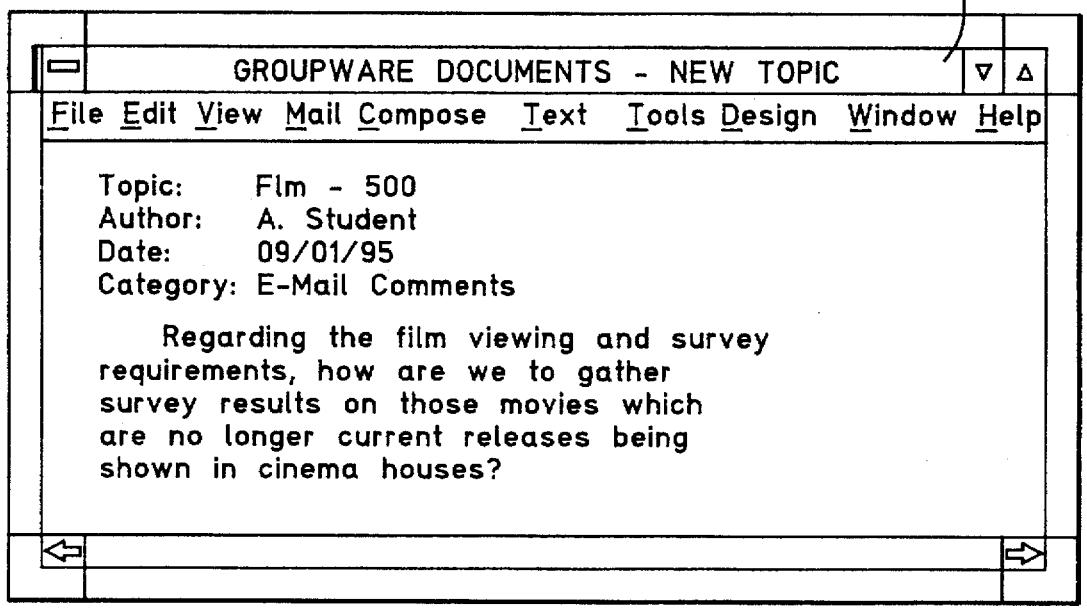
FIG. 8A is an example of a client creation of the equivalent of an electronic mail (e-mail) document that is to be stored in the groupware document database.
Figure 8B:
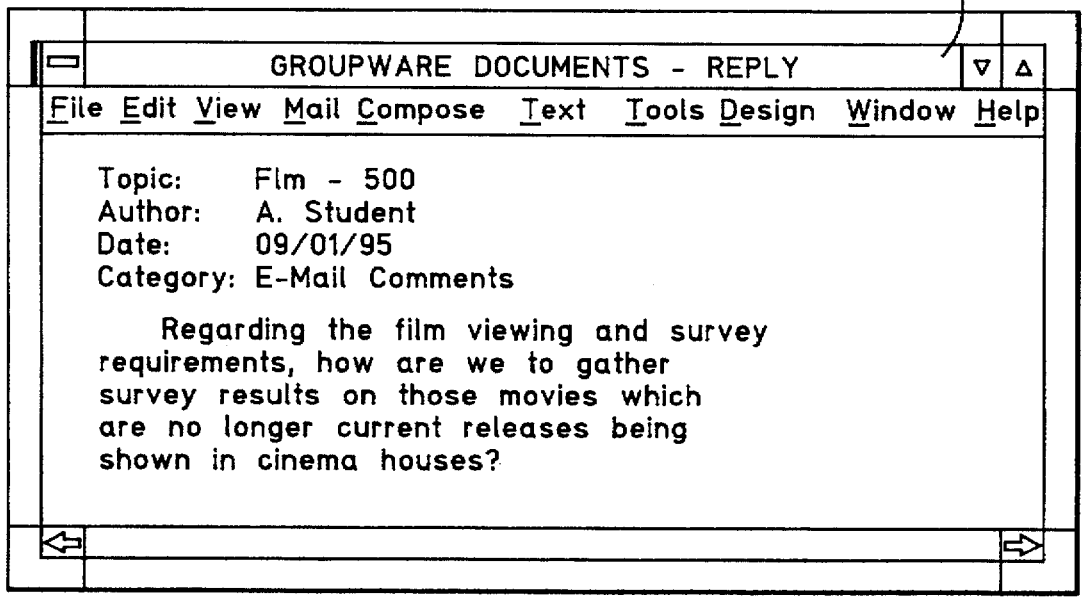
FIG. 8B is an example of a client creation of a e-mail document that is a reply to the e-mail document of FIG. 8A.

FIGS. 8A and 8B are examples of text documents that are compiled via the equivalent of e-mail. FIG. 8A shows a comment sent by "A. Student" on Sep. 1, 1995 for the course Flm-500. Note that the title bar 79 indicates that e-mail is a "New Topic." FIG. 8B shows the hypothetical professor of this course viewing the document with the option of entering a "Reply" (see title bar 79), to the "New Topic" entered by A. Student.

Operation of the Invention

FIGS. 10–19 describe the operation of this invention in flow diagram form. Each sequence of operation is performed by the logic modules described above in the groupware environment shown in FIG. 1. Initially, the module obtains the date of the last incremental back up, which has been stored on the backup server (which could be in any secure place).

Referring to FIG. 10, the operation of the incremental backup module 72 is shown. In step 86, the module notifies the backup server of the database name and path. In step 87, the module searches through the database to identify the documents that have been modified, added, or deleted (changed) since the last incremental back up. Recall that deleting a document since the last incremental back up is treated as a modification of that particular document within the database. In steps 87 and 88, if the document is a deleted document, then data that can be used to identify the document later is added to a list. Steps 89–91 do not apply to deleted documents. In Step 89, contents for the identified documents are translated into a self-describing datastream. In steps 90 and 91, if the document contains rich-text data, i.e. a groupware object, then that object is also translated to the datastream. Steps 90 and 91 can be repeated if more than one groupware object exists in the document. In step 92, the self-describing datastream is sent as a data object to the backup server 22. The database path and internal id of the document are also sent to the backup server 22. The processing in Steps 87–92 can occur for each new, or changed, document in the groupware database. In Step 93, the backup server 22 is notified of all the documents that have been deleted from the groupware database. In step 94, the backup date/time (timestamp) are saved in the backup server 22 or in some secure place; then the backup server 22 performs the backup operation. It will be apparent to those skilled in the art that the above-described logic can be extended to multiple databases for a single execution.

Figures 11, 12:
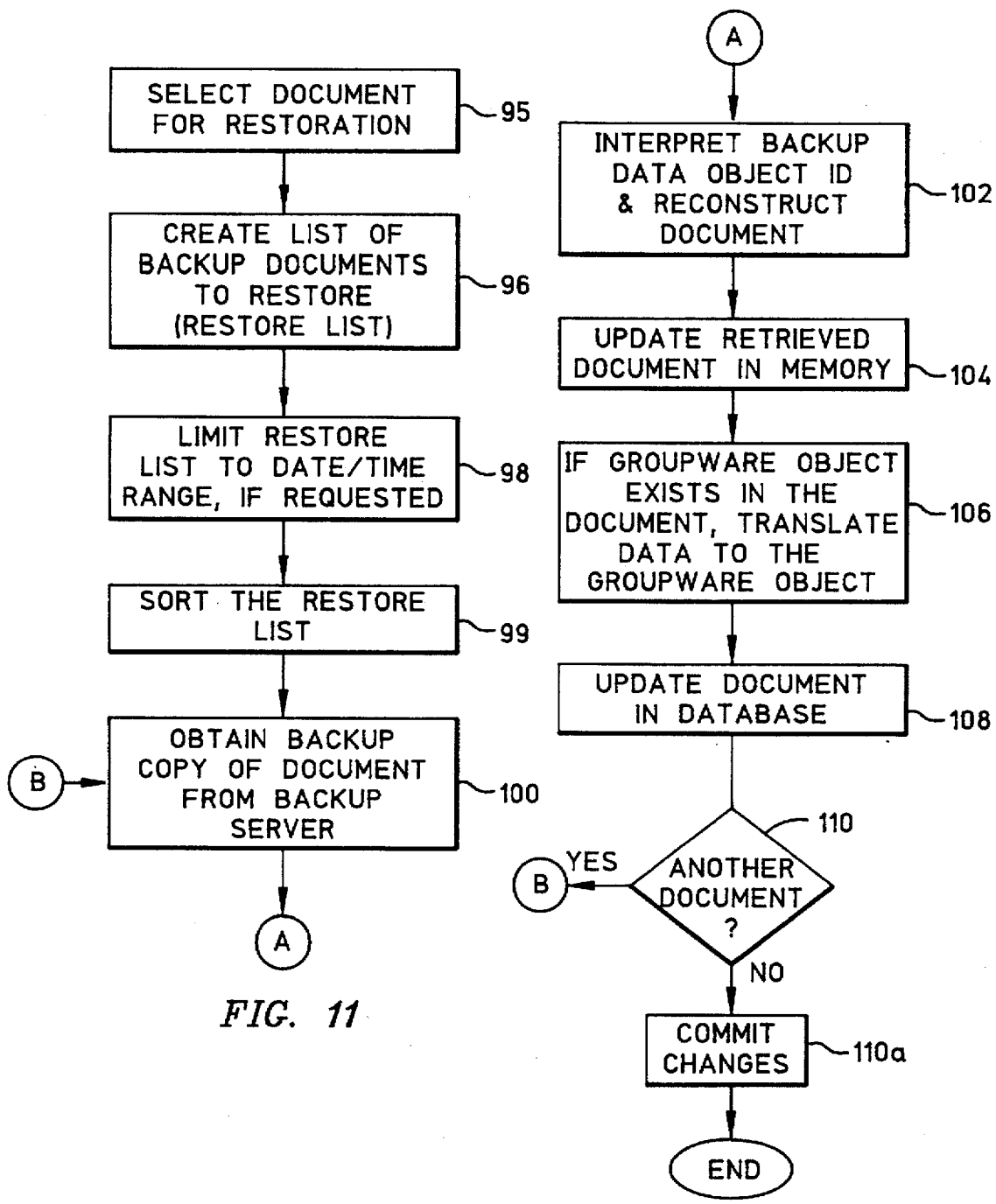

FIG. 11 shows restoration of an existing document as performed by module 74. In order to invoke this module, the user specifies the document he wants to restore by selecting for viewing an existing document from a database. For example, FIG. 7 shows a document selected for viewing. Once the document is loaded into main memory, then logic module 74 can be used to obtain the document's internal ID. For example, the inventor has critically recognized that the currently popular groupware application Lotus Notes has an internal ID that is unique to each document and it is referred to as a universal ID (UNID). This internal ID can then be translated into a data object ID that is sent to the backup server. Generally, the logic module 74 takes advantage of the inventor's critical recognition, and solves the problem of selecting a document for back up which has no external identifier such as a name or title.

The step-by-step application of the general operation of module 74 is described below. In step 95, the user identifies which document or documents he wants to restore by viewing an existing document from the groupware database 38. In step 96, the module creates a restore list of data objects representing eligible document back up copies from the backup server. In step 98, each document is tested against user-supplied date/time criteria. The eligible document backup copies (those that pass the test) are added to the restore list. In step 99, the restore list is sorted such that off-line media, including sequential media, is accessed efficiently. A backup copy of the document is obtained from the backup server in step 100. Connecting step "A" is used at the end of FIG. 11 and at the beginning of FIG. 12 to show connectivity between the steps of these two flowcharts. In general, an identical letter appearing in one flow diagram, such as FIG. 11, and also in another diagram, such as FIG. 12, is used to show connectivity of processing from one flow diagram to another.

Referring to FIG. 12, the self-describing data object is interpreted to reconstruct the document, in step 102. In step 104 the existing document that was retrieved into memory in step 96 is updated. In step 106, if a groupware object exists in the document, then the restored data is translated to a groupware object. Step 106 can be repeated if more than one groupware object exists in a document. In step 108, the existing document in the database is updated to reflect the update of the retrieved document in step 104. The logic 66 checks to see if there is another document to be retrieved in step 110, and if there is, processing continues to connecting step B and back to step 94 of FIG. 11. Then processing repeats the above steps 94 through 108 until the test in step 110 is satisfied because there are no remaining documents. In step 110a, the updated database is written to the hard disk.

Figures 13, 14:
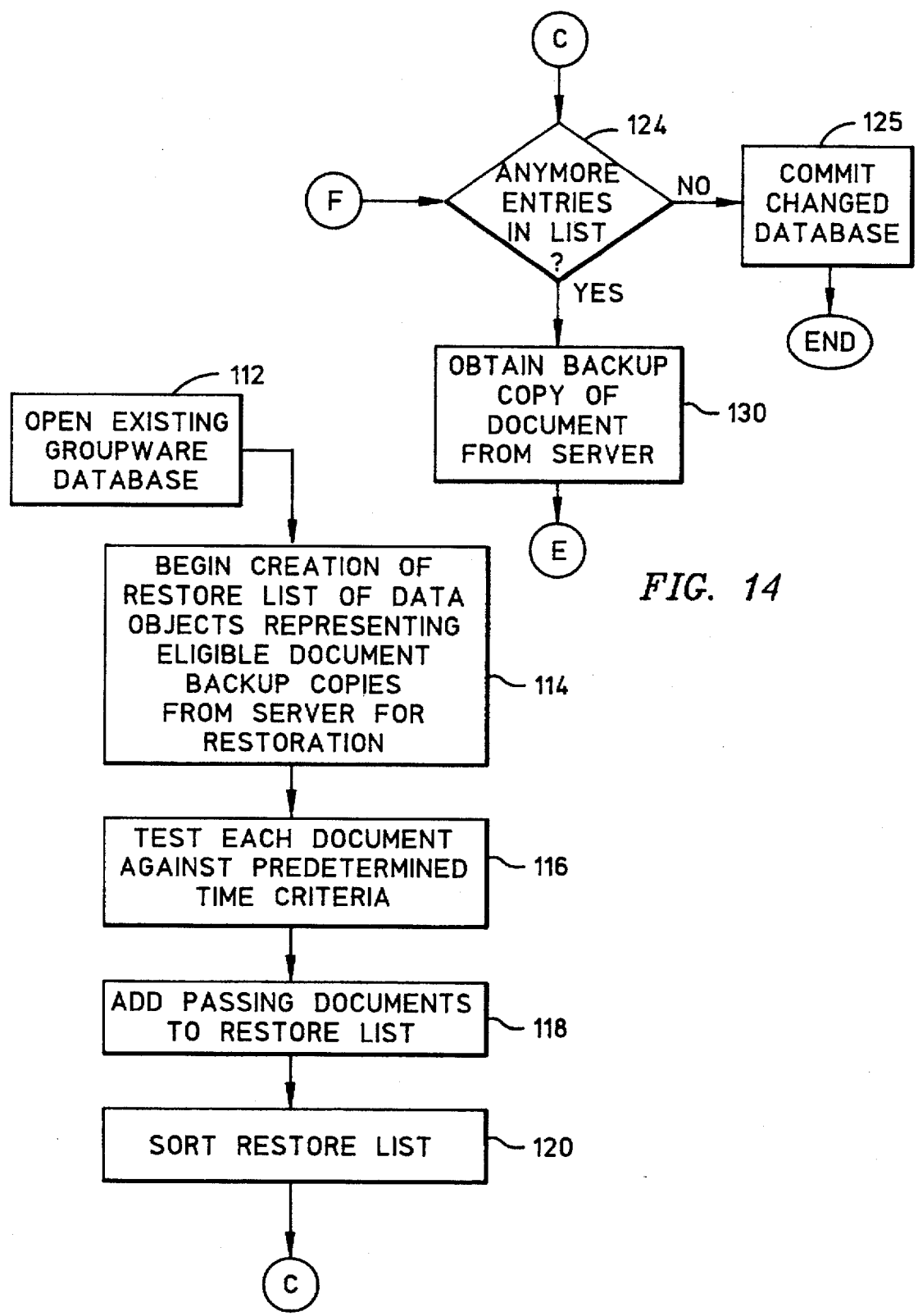
Figure 15:
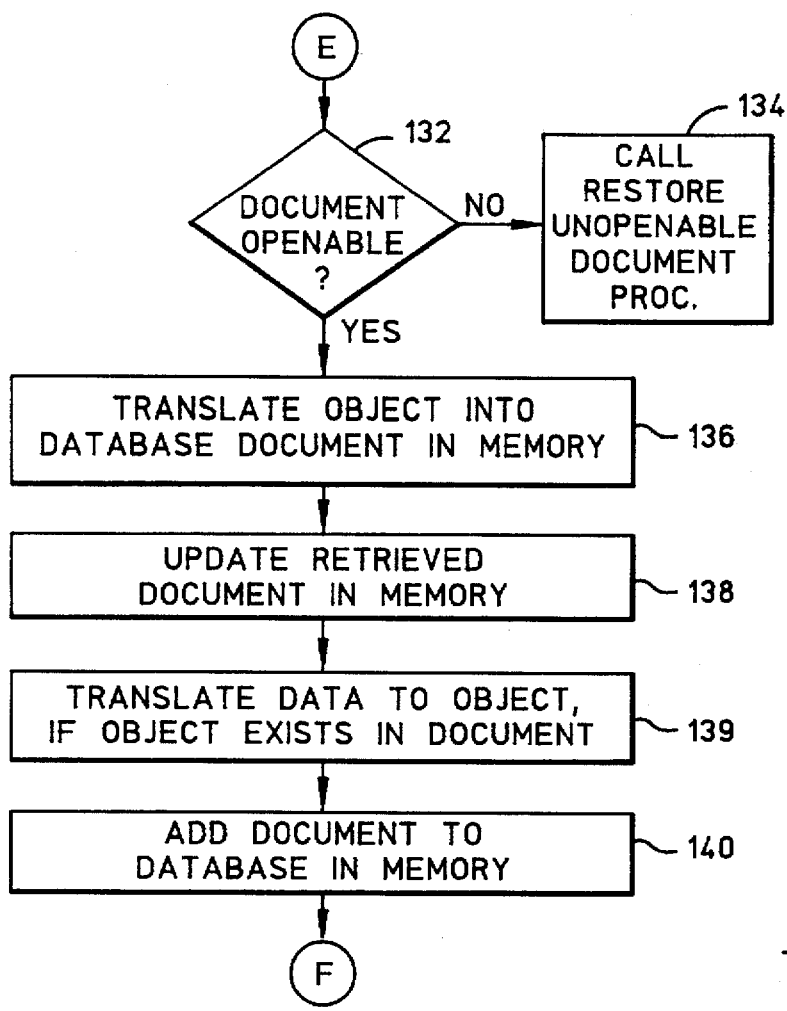

FIGS. 13–15 show the operation of logic module 76 which provides a capability of restoring an entire database. The inventor has recognized that there will be situations which require that an entire database be recovered to its state at a particular point in time. To support this type of recovery, a sufficient number of versions of every document in the database must be kept in the backup server. In such a situation the logic of this invention works together with a well-known database-level backup product such as ADSM to make a database-level copy of the database. The logic then takes enough periodic incremental back ups of each database to cover any updates since the database level copy was made. This is advantageous because it is no longer necessary to keep an inordinate number of backup versions in the server for all those databases whose data changes on an extremely frequent basis once this invention is implemented on a groupware document database.

FIG. 13 shows the basic steps of restoring an entire database by merging restored documents with the restored database. The following steps are understood to begin after the user uses a well known database-level backup system, such as ADSM to restore the database-level copy of the database. In step 112, that restored groupware database is opened. In step 114, module 76 begins the step of creating a restore list of data objects representing eligible document backup copies from the server for restoration. Each document is tested against a pre-determined time criteria, in step 116, to determine those which are eligible. For example, the user may optionally specify a "from date/time" and "to date/time", whose combination defines a range in which eligible document backup copies must fall. The eligible document backup copies, i.e., those that pass the test will be added to the restore list in step 118. In step 120, the restore list is sorted such that off-line media, including sequential media, is accessed efficiently. Processing continues to continuation step C.

FIG. 14 shows a continuation of the operation of logic module 76 in a first embodiment of restoring an entire database. Following continuation step C, an inquiry is posed in step 124 to see if there are remaining entries in the list. If the answer is "no" then the updated database is committed by being written to the hard disk in step 125, and processing ends in step 126. If the answer is "yes" then processing flows step 128. In step 130, a backup copy of the document from the backup server is obtained. Processing continues to continuation step E.

FIG. 15 shows the continuation of the process described above. Following continuation step E, in step 132, the module checks to see if the document can be opened for updating. For example, if a document has been marked to be deleted then it cannot be opened. If the answer to the inquiry of step 132 is "no" then, in step 134, module 76 calls the "unopenable document restore" module 78. The operation of module 78 is described below with reference to FIGS. 18 and 19. If the answer to the inquiry in step 132 is "yes", then, in step 136, the data object is translated to place the database document in memory. The document is updated in memory in step 138. And the document in the database is updated with the restored document, in step 140.

Continuation step F continues back to FIG. 14 and flows into step 124 where module 76 checks to see if there are remaining entries in the list and processing of steps 128 and 140 are repeated until there are no remaining eligible entries in the list. When there are no more entries the updated database is written to the hard disk and the processing ends in step 126.

Figure 16:
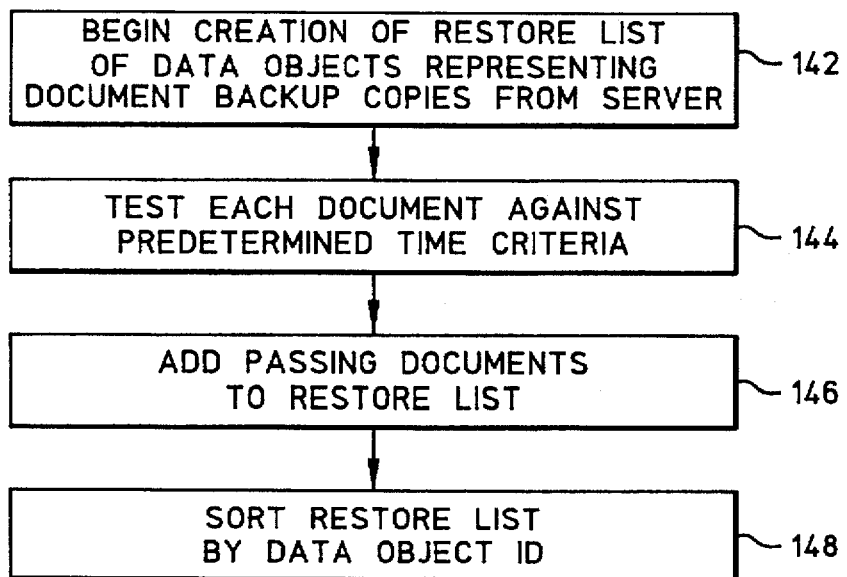

FIG. 16 shows a second embodiment for carrying out the restore of an entire database by module 76. This embodiment is based on the inventor's critical recognition that it may be sufficient to rebuild a copy of a groupware database from backup copies of documents. This embodiment does not rely on an independent database-level back up system, but rather relies on there being a sufficient number of versions of document backup copies kept on the backup server which supports such a restore.

FIG. 16 shows the basic steps of rebuilding a database solely from backup copies of documents. Implicitly, it is to be understood that data will not allowed to be restored into an existing file. Therefore, tests will be performed to ensure that an existing file is not overwritten before the following steps are carried out. Step 142 is the beginning step of the process. In step 144, each document is tested against a predetermined time criteria in a similar fashion as described above with reference to the first embodiment. Passing documents are added to the restore list as shown in step 146. In step 148, the restore list is sorted into an order that promotes efficient access to mountable media. Processing continues through continuation step G into FIG. 17.

Figures 17, 18:
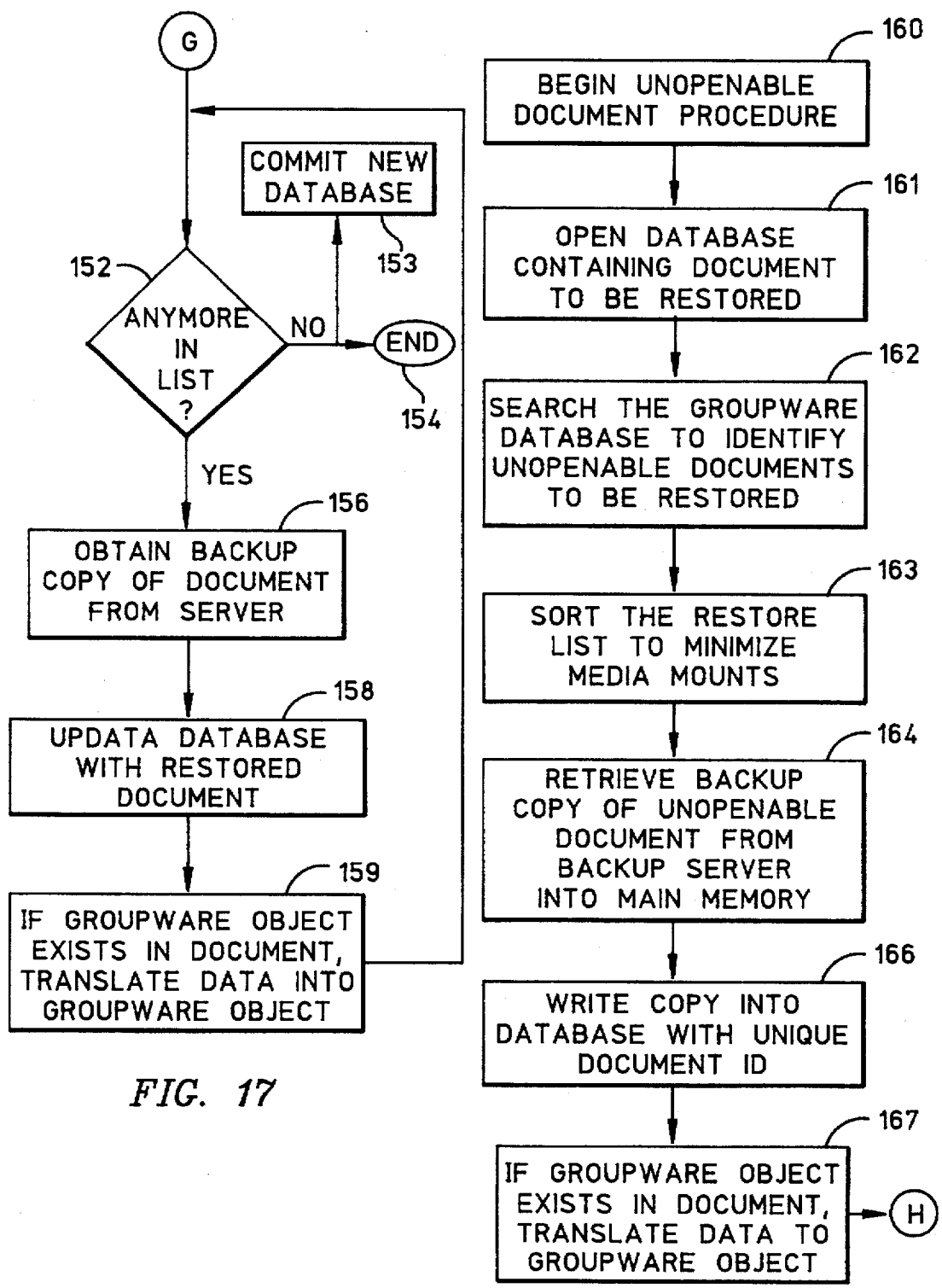

Referring to FIG. 17, in step 152, logic module 76 checks to see if there are remaining eligible entries in this list and if the answer is "no" processing ends in step 154. However, if the answer is "yes", then processing continues into step 156. In step 156, for the next data object entry in the list, the module retrieves a backup copy of the document from the server. In step 156, the backup copy of the document, which is in the form of a self-describing data stream, is obtained from the backup server. In step 158, the database is updated with the restored document. In step 159, if the data stream indicates a groupware object, then that object is built and entered in the database. Processing continues back to the inquiry in step 152 until there are no remaining entries in the list and then processing continues to step 153, in which the data in the new database is written to the hard disk and step 154 in which case it ends.

Figure 19:
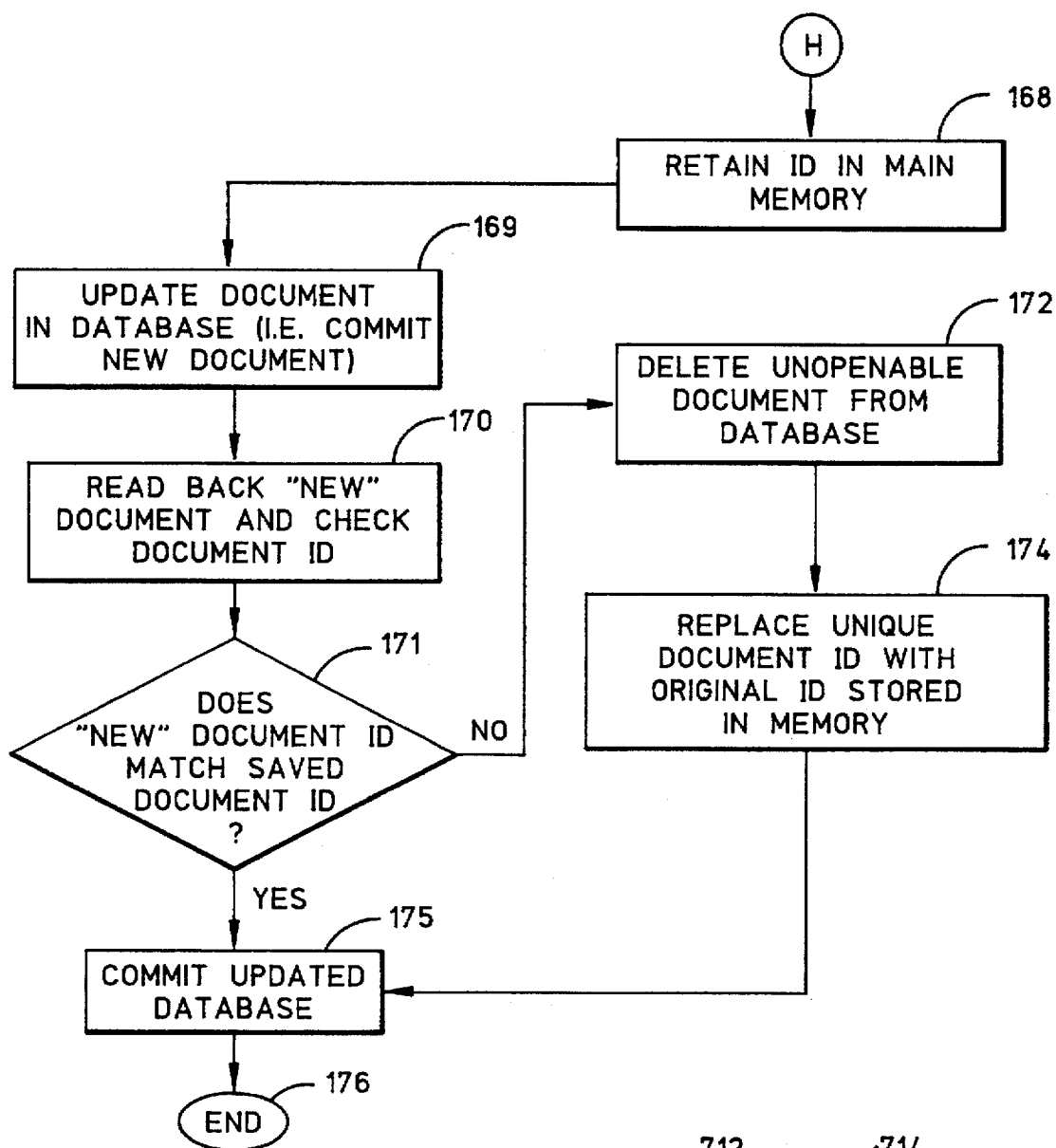

FIGS. 18 and 19, described below, describe the operation of logic module 78 which is used to restore documents that are unopenable. An example of an unopenable document is that which occurs with the well known groupware product Lotus Notes. Lotus Notes uses a procedure of creating "deletion stubs". Presence of a deletion stub communicates to a replication process used for moving data between databases that a database has a deletion that must be replicated to other databases. Since the deletion stub indicates that a file is no longer accessible, there is no convenient facility in the prior art to open a document marked with a deletion stub. Since with prior art systems the document cannot be opened, it cannot be directly read or updated. FIG. 18 and 19 show the basic steps to restore a document that cannot be opened or updated directly. Step 160 shows the beginning of the restorer of an unopenable document procedure. In step 161, the database into which the document is to be restored is opened. In step 162, the groupware database is searched to identify the documents to be restored. In step 163, the list of documents is sorted to minimize media mounts. In step 164, a backup copy of the unopenable document is retrieved from the backup server into main memory. Then, in step 166, the module writes the backup copy into the database with the original unique document ID. In 167, if the restore data stream indicates a groupware object, then the data is translated to a groupware object. Continuation step H flows into FIG. 19 where the step for processing is shown.

In step 168, the original document id from the backup copy is retained in main memory. In step 169, the newly created document is committed to the database. In step 170, that same document is read back into memory, and the document id is checked. In step 171, if this document id is the same as the saved id, then the update worked, even without an "open", so the updated database is committed to the hard disk in step 175 and processing ends in step 176. If, in step 171, the IDs do not match, then processing continues in step 172. In step 172, the unopenable document is deleted from the database. Then, in step 174, the unique document ID is replaced with the original ID stored in memory. Thus, the document which had been marked as unopenable has been restored in the database by module 78. Changes to the database are committed to the hard disk in step 175. Processing ends in step 176.

Article of Manufacture Embodying Logic of this Invention

Figure 20:
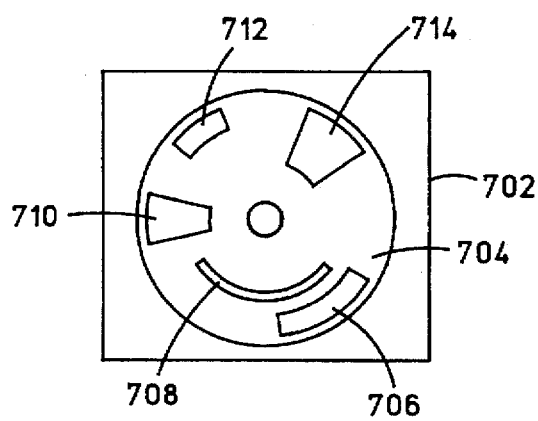
FIG. 20 is an article of manufacture, such as pre-recorded floppy disk, or other similar computer program product, for use in the groupware environment of FIG. 1 with program means recorded thereon for directing the data processing system to facilitate the practice of the method of this invention as shown in flow charts in FIGS. 10–19.

While this invention is primarily discussed as a method, it can be understood by a person of ordinary skill in the art that the apparatus discussed above in connection with FIGS. 1 and 2 may be programmed or otherwise designed to facilitate the practice of the method of this invention. Also, an article of manufacture such as a pre-recorded floppy disk 702 in FIG. 20, or other similar computer program product for use with a data processing system, such as the data processing system of FIG. 1, could include a storage medium such as magnetic storage medium 704 and program means recorded thereon, such as program means 706, 708, 710, 712 and 714 for directing the data processing system to facilitate the practice of the method of this invention. It will be understood that such apparatus and articles of manufacture also fall within the spirit and scope of this invention.

Other embodiments and modifications of this invention may occur to those of ordinary skill in the art in view of these teachings. Therefore, this invention is limited only by the following claims, which include all such embodiments and modifications when viewed in conjunction with the above specification and accompanying drawing.

What is claimed is:

1. In a data processing system including a groupware document server managing a plurality of documents stored in a groupware document database, the groupware document server having groupware server logic, the system further including a backup server coupled to the groupware document server for providing backup services, and main memory coupled to the groupware document server, each document in the plurality of documents containing zero or more data items and having one or more internal identifiers (IDs) that identify the document to the groupware server logic, the database including a database path identifying a storage location of the document, wherein the server logic is configured to allow viewing of documents stored in the database, a method for ensuring data integrity of at least one document of the plurality of documents, the method comprising:

querying the groupware server logic to determine items contained in at least one specified document and internal IDs used to identify the at least one specified document;

building for the at least one specified document, a document data object with a data structure having a plurality of data fields, the plurality of data fields including zero or more item data fields containing information describing corresponding items contained in the at least one specified document, at least one identifier field containing information describing internal IDs used to identify at least one specified document and a database path field representing a database path; and backing up the groupware document database or restoring the at least one specified document in response to information contained in the plurality of data fields in the document data object.

2. The method of claim 1, wherein backing up includes incrementally backing up of the groupware database by:

identifying documents that have been changed since a previous backup operation;

specifying each document identified during the identifying step by building a document data object for the document;

sending each data object built during the specifying step to the backup server; and performing a backup operation on the backup server using information contained in the sent data objects for each specified document.

3. The method of claim 2, wherein the identifying step includes the step of identifying one or more documents having accompanying deletion markers that indicate that the one or more documents are marked for deletion from the groupware document database.

4. The method of claim 2, wherein, in the identifying step, a document is identified as changed if it has data that has been modified since the last back up operation.

5. The method of claim 2, wherein, in the identifying step, a document is identified as changed if the document has been added to the groupware document database since the last back up operation.

6. The method of claim 2, wherein a document has been changed if new data has been added to the document since the last backup operation.

7. The method of claim 2, wherein, in the identifying step, a document is identified as changed if it has been marked to be deleted.

8. The method of claim 2, wherein the groupware server manages a plurality of groupware document databases, each having a plurality of documents and the method performs the step of incrementally by backing up each groupware document database of the plurality of groupware document databases substantially simultaneously.

9. The method of claim 3, further comprising notifying the backup server of identified documents having deletion markers, and deleting the identified documents having deletion markers at the backup server.

10. The method of claim 1, the data processing system including means for marking a document as unopenable, wherein restoring the at least one specified document when the document is marked as unopenable includes:

(a) retrieving into the main memory a most recent backup copy of the document marked as being unopenable;

(b) building a document data object for the most recent backup copy;

(c) storing information from the document data object describing the internal IDs of the most recent backup copy into the main memory;

(d) storing the most recent backup copy in the groupware document database;

(e) reading the most recent backup copy from the groupware document database and comparing internal IDs in the most recent backup copy with the internal IDs stored in the main memory; and, if the internal IDs do not match;

(f) deleting the document marked as unopenable from the groupware document database; and (g) replacing the unique document IDs of the most recent backup copy stored in the groupware document database with the internal IDs stored in main memory;

otherwise, repeating steps (a)–(e) until the IDs match.

11. The method of claim 1, wherein the at least one specified document has been selected for viewing and restoring the at least one specified document includes:

building a document data object for the document;

retrieving into main memory a backup copy of the document from the backup server;

using information contained in the document data object to reconstruct the document;

updating the backup copy in main memory with information from the reconstructed document; and replacing the document with the backup copy in the database.

12. The method of claim 1, wherein restoring includes restoring a plurality of documents belonging to the groupware document database on the groupware server by:

building a plurality of document data objects, wherein each document data object represents an eligible backup copy of a document to be restored, eligibility being determined by comparing a record of a time when the backup copy was created to a predetermined time criterion;

creating a restore list containing each of the document data objects that represent eligible backup copies;

sorting the restore list to minimize potential mounts of media used by the backup server;

obtaining from the backup server a backup copy for each document represented by a document data object in the restore list of the document from the backup server; and for each obtained backup copy replacing each document in the groupware document database corresponding to a data object in the restore list for which a respective backup copy is obtained.

13. The method of claim 12, wherein if a document represented by a document data object in the restore list is marked as being unopenable then the unopenable document is restored by:

retrieving into the main memory a backup copy of a document marked by the groupware server logic as being unopenable;

building a document data object for the retrieved unopenable document;

storing the information from the document data object describing the internal IDs of the backup copy into the main memory;

storing the backup copy in the document database;

reading the newly stored document from the database to compare its id with the id save in main memory;

conditionally deleting the unopenable document from the database; and replacing the unique document IDs of the backup copy stored in the document database with the internal IDs stored in main memory.

14. A data processing system for enabling back up and restore of at least one groupware document of a plurality of groupware documents stored in a groupware document database on a groupware document server having groupware server logic, each document containing zero or more data items and having an internal identifier (ID) that is used to identify the document to the groupware server logic and further having a database path identifying a storage location of the document, the server logic being configured to allow viewing of documents stored in the database, the system comprising:

a groupware document server having a plurality of documents stored in a groupware document database;

a backup server coupled through a communications network to the groupware document server;

main memory coupled to the groupware document server; and logic coupled to main memory and the backup server and to the groupware document server and having machine-executed means for:

querying the groupware server logic to determine what items are contained in at least one specified document and what internal IDs are used to identify the at least one specified document to the groupware server logic;

building a data object for the at least one specified document that includes a data structure having a plurality of data fields, the plurality of data fields including zero or more item data fields containing information describing each item contained in the at least one specified document, at least one identifier field containing information describing internal IDs that are used to identify the particular document to the groupware server logic; and using the data object to ensure data integrity of the particular document by enabling back up and restore operations that use the information contained in the data fields in the data object.

15. The system of claim 14, wherein the back up operations enabled by the building of the data object include operations to incrementally perform a back up of the groupware database by:

searching through the database to identify the documents that have been changed since the last back up operation;

specifying each document identified during the searching step, and in response to the specifying of a document building the data object;

sending each built data object to the backup server; and performing a back up operation on the backup server using information contained in the sent data objects for each specified document.

16. The system of claim 15, wherein the means for searching includes means for searching to identify documents having accompanying deletion markers that indicate that the identified document is marked for deletion from the database.

17. The system of claim 15, wherein a document is identified as changed if it has data that has been modified since the last back up operation.

18. The system of claim 15, wherein a document is identified as changed if the document itself has been added since the last back up operation.

19. The system of claim 15, wherein data has been modified if new data has been added to the document since the last back up operation.

20. The system of claim 15, wherein a document is identified as changed if it has been marked to be deleted as a deletion stub.

21. The system of claim 15, wherein the groupware server includes a plurality of document databases each having a plurality of documents and the system performs the incremental back up on each database of the plurality of databases in a substantially simultaneous operation.

22. The system of claim 16, further comprising means for notifying the backup server of identified documents having deletion markers that are to be deleted by the backup server.

23. The system of claim 14, wherein the restore operations enabled by the building of the data object include operations to restore a document in the database that is marked as being unopenable by the groupware server logic by:

retrieving into the main memory a most recent backup copy of a document marked by the groupware server logic as being unopenable;

building the data object for the retrieved unopenable document;

storing the information from the data object describing the internal IDs of the backup copy into the main memory;

storing the backup copy in the document database;

reading the newly stored document from the database to compare its id with the id saved in main memory;

conditionally deleting the unopenable document from the database; and replacing the unique document IDs of the backup copy stored in the document database with the internal IDs stored in main memory.

24. The system of claim 14, wherein the restore operations enabled by the building of the data object include operations to restore an existing document by:

building the data object for a document selected for a document viewing operation;

retrieving into main memory a backup copy of the selected document from the backup server;

interpreting the information contained in the data object to reconstruct the document;

updating the backup copy in main memory with information from the reconstructed document; and replacing the selected document with the backup copy in the database.

25. The system of claim 14, wherein the restore operations enabled by the building of the data object include operations for restoring a plurality of existing documents belonging to the groupware document database on the groupware server by:

building a plurality of the data objects, wherein each built data object represents an eligible backup copy of a document to be restored, wherein eligibility is determined by comparing a date and time record of when the backup copy was created to a predetermined date and time criterion;

creating a restore list containing each of the data objects representing eligible backup copies;

sorting the restore list to minimize potential mounts of media used by the backup server;

obtaining from the backup server a backup copy for each document represented by a data object in the restore list of the document from the backup server; and for each obtained backup copy replacing each document in the database corresponding to a data object in the restore list for which a respective backup copy is obtained.

26. The system of claim 25, wherein if a document represented by a data object in the restore list is marked as being unopenable then the unopenable document is restored by:

retrieving into the main memory a most recent backup copy of a document marked by the groupware server logic as being unopenable;

building the data object for the retrieved unopenable document;

storing the information from the data object describing the internal IDs of the backup copy into the main memory;

storing the backup copy in the document database;

reading the newly stored document from the database to compare its id with the id saved in main memory;

conditionally deleting the unopenable document from the database; and replacing the unique document IDs of the backup copy stored in the document database with the internal IDs stored in main memory.

27. A computer program product for enabling back up and restore of at least one groupware document of a plurality of groupware documents stored in a groupware document database on a groupware document server having groupware server logic for use in a data processing system including a groupware document server having a plurality of documents stored in a groupware document database, a backup server coupled through a communications network to the groupware document server, main memory coupled to the groupware document server, each document containing zero or more data items and having an internal identifier (ID) that is used to identify the document to the groupware server logic and further having a database path identifying a storage location of the document, wherein the server logic is configured to allow viewing of documents stored in the database, the program product comprising:

a recording medium;

means, recorded on the recording medium for:

querying the groupware server logic to determine what items are contained in at least one specified document and what internal IDs are used to identify the at least one specified document to the groupware server logic;

building a data object for the at least one specified document that includes a data structure having a plurality of data fields, the plurality of data fields including zero or more item data fields containing information describing each item contained in the at least one specified document, at least one identifier field containing information describing internal IDs that are used to identify the particular document to the groupware server logic; and using the data object to ensure data integrity of the particular document by enabling back up and restore operations that use the information contained in the data fields in the data object.

28. The computer program product of claim 27, wherein the means recorded on the recording medium for enabling back up operations include means for incrementally performing a backup of the groupware database by:

searching through the database to identify the documents that have been changed since the last back up operation;

specifying each document identified during the searching step, and in response to the specifying of a document building the data object;

sending each built data object to the backup server; and performing a back up operation on the backup server using information contained in the sent data objects for each specified document.

29. The computer program product of claim 28, including means for searching to identify documents having accompanying deletion markers that indicate that the identified document is marked for deletion from the database.

30. The computer program product of claim 28, wherein a document is identified as changed if it has data that has been modified since the last back up operation.

31. The computer program product of claim 28, wherein a document is identified as changed if the document itself has been added since the last back up operation.

32. The computer program product of claim 28, wherein data has been modified if new data has been added to the document since the last back up operation.

33. The computer program product of claim 28, wherein a document is identified as changed if it has been marked to be deleted with a deletion stub.

34. The computer program product of claim 28, wherein the groupware server includes a plurality of document databases each having a plurality of documents and the computer program product performs the incremental back up on each database of the plurality of databases in a substantially simultaneous operation.

35. The computer program product of claim 29, further comprising means for notifying the backup server of identified documents having deletion markers that are to be deleted by the backup server.

36. The computer program product of claim 27, wherein the means recorded on the recording medium for enabling restore operations include operations to restore a document in the database that is marked as being unopenable by the groupware server logic by:

retrieving into the main memory a most recent backup copy of a document marked by the groupware server logic as being unopenable;

building the data object for the retrieved unopenable document;

storing the information from the data object describing the internal IDs of the backup copy into the main memory;

storing the backup copy in the document database;

reading the newly stored document from the database to compare its id with the id saved in main memory;

conditionally deleting the unopenable document from the database; and replacing the unique document IDs of the backup copy stored in the document database with the internal IDs stored in main memory.

37. The computer program product of claim 27, wherein the means recorded on the recording medium for enabling restore operations include means for restoring an existing document by:

building the data object for a document selected for a document viewing operation;

retrieving into main memory a backup copy of the selected document from the backup server;

interpreting the information contained in the data object to reconstruct the document;

updating the backup copy in main memory with information from the reconstructed document; and replacing the selected document with the backup copy in the database.

38. The computer program product of claim 27, wherein the means recorded on the recording medium for enabling restore operations include means for restoring a plurality of existing documents belonging to the groupware document database on the groupware server by:

building a plurality of the data objects, wherein each built data object represents an eligible backup copy of a document to be restored, wherein eligibility is determined by comparing a date and time record of when the backup copy was created to a predetermined date and time criterion;

creating a restore list containing each of the data objects representing eligible backup copies;

sorting the restore list to minimize potential mounts of media used by the backup server;

obtaining from the backup server a backup copy for each document represented by a data object in the restore list of the document from the backup server; and for each obtained backup copy replacing each document in the database corresponding to a data object in the restore list for which a respective backup copy is obtained.

39. The computer program product of claim 38, wherein if a document represented by a data object in the restore list is marked as being unopenable then the unopenable document is restored by means for:

retrieving into the main memory a most recent backup copy of a document marked by the groupware server logic as being unopenable;

building the data object for the retrieved unopenable document;

storing the information from the data object describing the internal IDs of the backup copy into the main memory;

storing the backup copy in the document database;

reading the newly stored document from the database to compare its id with the id saved in main memory;

conditionally deleting the unopenable document from the database; and replacing the unique document IDs of the backup copy stored in the document database with the internal IDs stored in main memory.

40. An apparatus for enabling back up and restore of at least one groupware document of a plurality of groupware documents stored in a groupware document database on a groupware document server having groupware server logic configured to communicate with a data processing system including a groupware document server having a plurality of documents stored in a groupware document database, a backup server coupled through a communications network to the groupware document server, each document containing at least one data item and having an internal identifier (ID) that is used to identify the document to the groupware server logic and further having a database path identifying a storage location of the document, wherein the server logic is configured to allow viewing of documents stored in the database, the apparatus comprising:

memory coupled to the groupware document server;

logic being loaded into the memory including:

a module configured to restore an existing document in the groupware document database;

a module configured to incrementally perform a back up of the groupware database to the backup server in order to back up only those documents in the database that have been changed since the most recent back up operation;

a module configured to restore a plurality of existing documents belonging to the groupware document database on the groupware server; and a module configured to restore a document in the database that is marked as being unopenable by the groupware server logic.

* * * * *